US009738291B2

United States Patent
Diebel et al.

(10) Patent No.: US 9,738,291 B2
(45) Date of Patent: Aug. 22, 2017

(54) SOLAR RAILWAY SYSTEM AND RELATED METHODS

(71) Applicants: Peter H. Diebel, Winter Park, FL (US); Jeffrey Gordon Soper, Tampa, FL (US)

(72) Inventors: Peter H. Diebel, Winter Park, FL (US); Jeffrey Gordon Soper, Tampa, FL (US)

(73) Assignee: REILLY QUINN CORPORATION, Winter Park, FL (US)

( * ) Notice: Subject to any disclaimer, the term of this patent is extended or adjusted under 35 U.S.C. 154(b) by 555 days.

(21) Appl. No.: 14/102,565

(22) Filed: Dec. 11, 2013

(65) Prior Publication Data

US 2014/0158013 A1 Jun. 12, 2014

Related U.S. Application Data

(60) Provisional application No. 61/735,812, filed on Dec. 11, 2012.

(51) Int. Cl.
*B61B 13/00* (2006.01)
*B61B 13/04* (2006.01)
*B60L 13/00* (2006.01)
*E01B 25/08* (2006.01)

(52) U.S. Cl.
CPC .............. *B61B 13/04* (2013.01); *B60L 13/00* (2013.01); *E01B 25/08* (2013.01); *Y02T 30/40* (2013.01); *Y02T 90/16* (2013.01)

(58) Field of Classification Search
CPC ........... B61B 13/04; B60L 13/00; E01B 25/08
See application file for complete search history.

(56) References Cited

U.S. PATENT DOCUMENTS

| 4,274,336 | A | * | 6/1981 | Pater | E01B 25/10 104/118 |
| 4,313,383 | A | * | 2/1982 | Parazader | E01D 19/125 104/118 |
| 4,375,193 | A | * | 3/1983 | Sullivan | B61B 13/04 104/118 |

(Continued)

FOREIGN PATENT DOCUMENTS

| CN | 102730011 | 10/2012 |
| JP | 2010219336 | 9/2010 |

(Continued)

OTHER PUBLICATIONS

International Search Report of Mar. 25, 2014 for PCT/US2013/074256.

(Continued)

*Primary Examiner* — Jason C Smith
(74) *Attorney, Agent, or Firm* — Robert L. Wolter; Beusse, Wolter, Sanks & Maire PLLC

(57) ABSTRACT

A solar railway system includes a monorail guideway structure elevated above ground and extending along a rail travel direction. The guideway structure has a hollow body extending in the rail travel direction and containing utility infrastructure. A walkable thoroughfare is within the hollow body for allowing worker access to the utility infrastructure. A solar energy collector is positioned on the guideway structure and is in electrical communication with the utility infrastructure.

22 Claims, 3 Drawing Sheets

(56) References Cited

U.S. PATENT DOCUMENTS

| | | | | |
|---|---|---|---|---|
| 4,781,119 A * | 11/1988 | Davis | | B60L 13/006 104/288 |
| 4,843,971 A * | 7/1989 | Braunagel | | E01B 25/24 104/299 |
| 4,885,995 A * | 12/1989 | Antosh | | B60L 13/10 104/118 |
| 4,958,575 A * | 9/1990 | Antosh | | B60L 13/10 104/118 |
| 4,964,793 A * | 10/1990 | Antosh | | B60L 13/10 104/118 |
| 4,987,833 A * | 1/1991 | Antosh | | B60L 13/10 104/118 |
| 5,819,189 A * | 10/1998 | Kramer | | B60L 9/00 318/602 |
| 6,782,832 B2 * | 8/2004 | Reichel | | B60L 13/00 104/124 |
| 6,785,945 B2 * | 9/2004 | Reichel | | E01B 25/32 104/120 |
| 7,495,351 B2 | 2/2009 | Fein | | |
| 7,501,713 B2 * | 3/2009 | Fein | | B60K 16/00 290/44 |
| 7,566,980 B2 | 7/2009 | Fein | | |
| 7,741,727 B2 | 6/2010 | Fein | | |
| 7,800,036 B2 | 9/2010 | Fein | | |
| 7,888,584 B2 | 2/2011 | Lyden | | |
| 7,909,567 B2 | 3/2011 | Fein | | |
| 8,061,494 B2 * | 11/2011 | Rameau | | B60M 1/307 104/124 |
| 2008/0154801 A1 * | 6/2008 | Fein | | B60K 16/00 705/412 |
| 2010/0252088 A1 | 10/2010 | Fein | | |
| 2011/0282540 A1 * | 11/2011 | Armitage | | H04Q 9/00 701/31.4 |
| 2012/0085387 A1 * | 4/2012 | French, Sr. | | F03D 11/04 136/245 |
| 2012/0090257 A1 | 4/2012 | Shen | | |
| 2012/0181973 A1 | 7/2012 | Lyden | | |
| 2013/0241466 A1 * | 9/2013 | Mitsuda | | H01M 10/441 320/103 |
| 2014/0158013 A1 * | 6/2014 | Diebel | | B61B 13/04 104/118 |
| 2015/0367736 A1 * | 12/2015 | Salomonsen | | B61C 5/00 105/35 |

FOREIGN PATENT DOCUMENTS

| | | |
|---|---|---|
| JP | 3168887 | 6/2011 |
| JP | 201165863 | 8/2011 |
| JP | 2012103082 | 5/2012 |

OTHER PUBLICATIONS http://inhabitat.com/a-solar-powered-monorail-system-for-bologna.
http://www.forcedgreen.com/2010/07/sky-train-solar-powered-monorail.
http://dvice.com/archives/2010/04/solar-and-wind-.php.
http://blog.floridaenergycenter.org/echronicle/2008/11/fsec-to-support-solar-powered-monorail-system-development/.
http://www.sbir.gov/sbirsearch/detail/309017.

* cited by examiner

SOLAR RAILWAY SYSTEM AND RELATED METHODS

CROSS-REFERENCE TO RELATED APPLICATION

This claims priority to U.S. provisional application 61/735,812, filed Dec. 11, 2012 and titled "Solar-Powered Railway," which is incorporated by reference herein in its entirety.

FIELD OF THE INVENTION

The invention relates to the field of monorails and, more particularly, to a solar monorail system that includes utility infrastructure.

BACKGROUND

There are many geographically isolated population centers that would benefit from having a monorail system connecting them together because monorails provide a quiet and efficient means of transportation. Unfortunately, however, most conventional monorails must be connected to an established and reliable electrical power source such as a power plant, which these population centers either do not have or the power plant they have already operates at maximum capacity.

To overcome this drawback, it would be advantageous to interconnect these isolated population centers with a monorail system that runs on solar energy. It would also be advantageous to use the monorail system as a means of delivering utilities such as electricity to the population centers.

An example of a solar-powered monorail system is described U.S. Pat. No. 4,885,995 to Antosh. The system includes a solar collector formed in the sides of the guideway for powering the trains. The system is also designed to feed any excess energy into an external power utility system. The electrical wiring that conducts the electricity is contained with a solid inner core, which would make it difficult to inspect and repair. Moreover, if this system is located in a remote region devoid of roads, it would be difficult to travel to a site that needs to be repaired.

What is needed is a solar railway system that is used for transportation and as a carrier of utility infrastructure, but also allows workers to easily travel to and access the utility infrastructure, even in remote geographic regions.

SUMMARY

In view of the foregoing, I developed a solar railway system that achieves this objective by including a guideway structure with a hollow body containing the utility infrastructure and a thoroughfare running along the hollow body for allowing workers to easily access the utility infrastructure.

In a first embodiment, the solar railway comprises a longitudinally extending elevated monorail track member; a guideway structure elevating the monorail track member and having a longitudinally extending hollow body defining an interior space containing utility infrastructure; a thoroughfare within the interior space for allowing worker access to the utility infrastructure; and a solar energy collector positioned on the guideway and in electrical communication with the utility infrastructure.

In another embodiment, the solar monorail system comprises a monorail guideway structure elevated above ground and extending along a rail travel direction, the monorail guideway structure having a hollow body extending in the rail travel direction and containing utility infrastructure therein; a walkable thoroughfare within the hollow body for allowing worker access to the utility infrastructure; and a solar energy collector positioned on the monorail guideway structure and in electrical communication with the utility infrastructure.

Preferred, but optional features of the solar monorail system include the following:

The utility infrastructure comprises one or more of power lines, communication lines, gas or oil lines, and water lines.

The monorail track member may comprise a laterally separated pair of longitudinally extending monorail tracks with the solar energy collector positioned therebetween.

The solar energy collector may include a pair of opposed longitudinally extending solar panel sections angling downwardly from a common apex thereof toward the guideway structure.

The interior space of the guideway structure may be defined by longitudinally extending solid interior walls adapted to isolate the interior space from exterior weather conditions.

The guideway structure may be upwardly supported by a plurality of longitudinally spaced apart vertical beams contacting underlying terrain with the thoroughfare extending all the way between the vertical beams.

The thoroughfare may be defined by a floor of the interior space of the guideway structure, the floor being elevated above ground.

In a method aspect, a method of providing a solar railway system comprises positioning a solar energy collector on a monorail guideway structure elevated above ground and extending along a rail travel direction, the monorail guideway structure having (a) a hollow body extending in the rail travel direction, (b) utility infrastructure therein, and (c) a walkable thoroughfare within the hollow body for allowing worker access to the utility infrastructure.

These and other embodiments, aspects, features, and advantages will be understood better by referring to the Detailed Description of Preferred Embodiments and the Drawings.

DETAILED DESCRIPTION OF PREFERRED EMBODIMENTS

The Summary and Detailed Description of Preferred Embodiments make reference to particular features of the invention. Where they disclose a particular feature in the context of a particular aspect or embodiment, that feature can also be used, to the extent possible, in combination with and/or in the context of other particular aspects and embodiments.

In this section, preferred embodiments are described more fully with reference to the drawings. This invention may, however, be embodied in many different forms and should not be construed as limited to the embodiments set forth herein. Rather, these embodiments are provided so that this disclosure will convey preferred embodiments to those skilled in the art.

Figure 1:
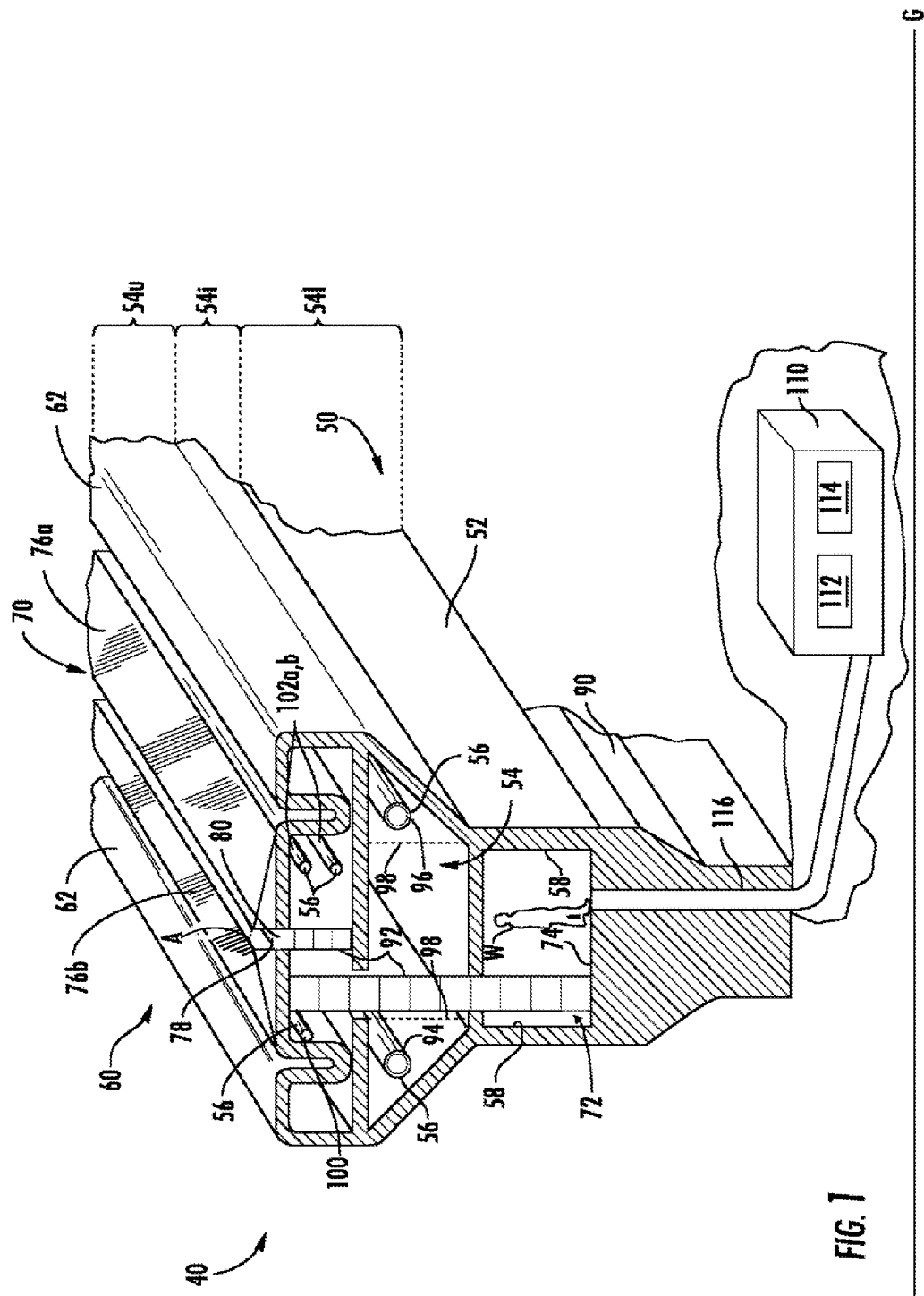
FIG. 1 is perspective view of a solar railway system in accordance with an embodiment of the invention, cutaway to show the interior space of the guideway structure.
Figure 2:
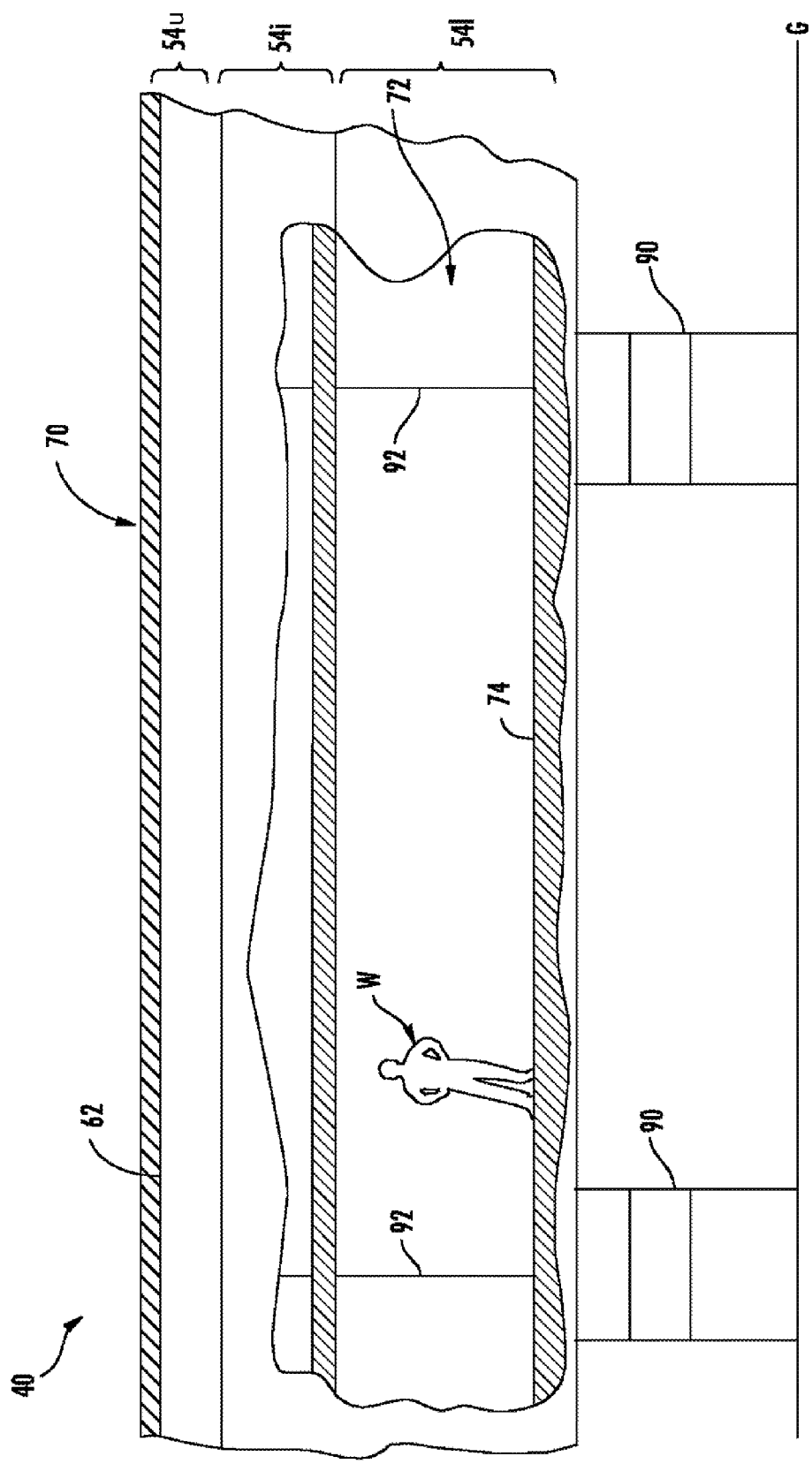
FIG. 2 is a side view of the solar railway system of FIG. 1, with the guideway structure partially cutaway to show the interior space.
Figure 3:
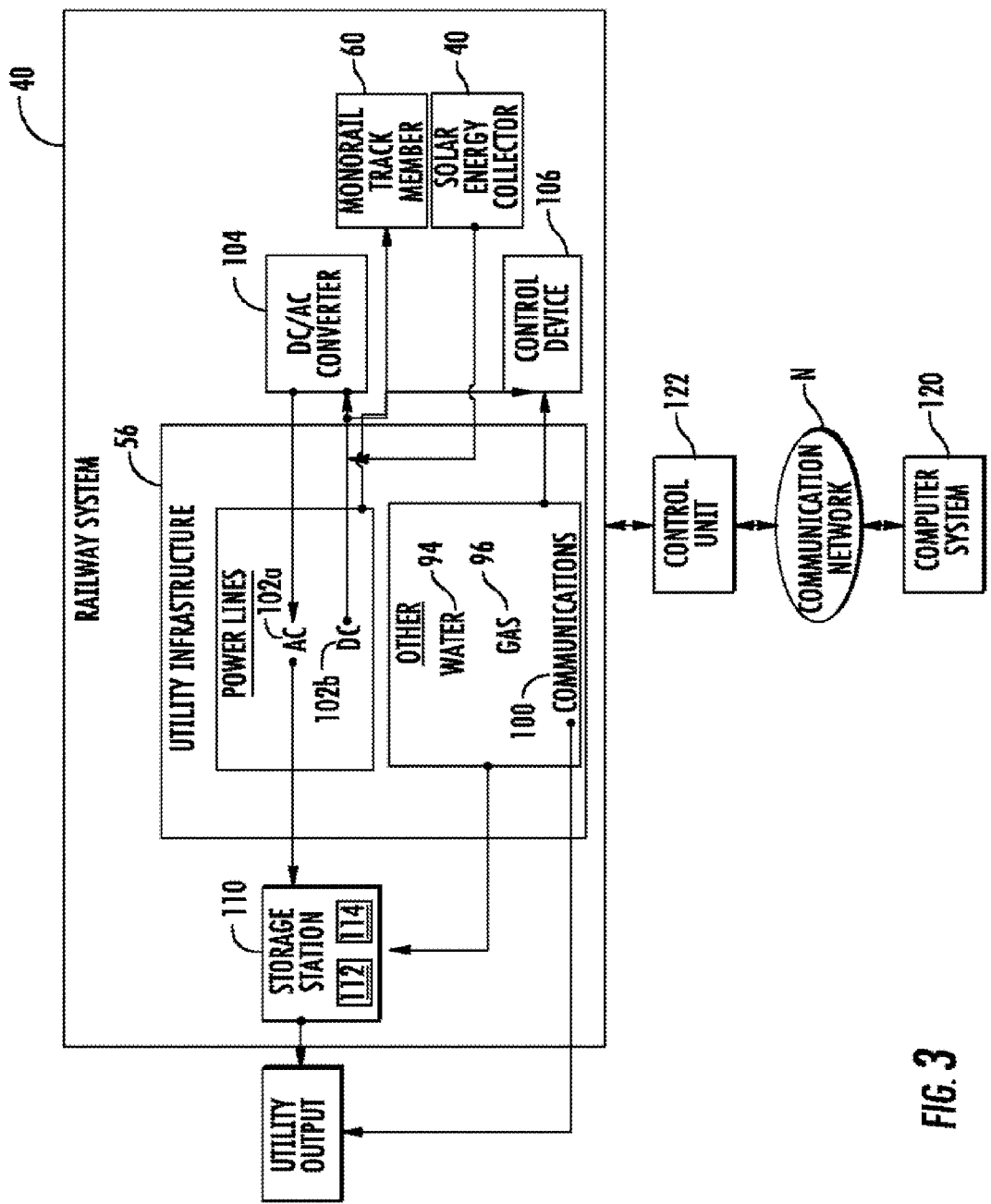
FIG. 3 is a schematic showing how aspects of the railway system are interconnected.

Referring to FIGS. 1-3, a solar railway system 40 according to an embodiment of the invention includes a guideway structure 50 elevating a monorail track member 60 above ground G and a solar energy collector 70 positioned on the guideway structure 50 to convert sunlight into electrical energy. The electrical energy is used to power rolling stock (not shown) that moves along the monorail track member 60. Any surplus electrical energy can either be stored or fed into a utility grid. The solar railway system 40 is adapted to function as a means of transportation and also a means of providing utilities, such as electricity, to geographic locations in the vicinity thereof.

The monorail track member 60 includes one or more monorail tracks 62 that extend in a longitudinal direction along the direction of rail travel. In the exemplary embodiment shown, the monorail track member 60 includes a laterally separated pair of monorail tracks 62 running longitudinally parallel to one another. Although having a pair of monorail tracks 62 is not necessary, doing so is advantageous because it allows for bi-directional rail travel.

The type of monorail tracks 62 used may vary depending on the type of rolling stock that is desired. Suitable types of monorail tracks include, but are not limited to, those of conventional "Inverted-T" or "ALWEG" monorails.

The guideway structure 50 elevates the monorail track member 60 above ground and also serves as a utility conduit. The guideway structure 50 includes a longitudinally extending hollow body 52 defining an interior space 54 containing utility infrastructure 56. The hollow body 52 defines solid interior walls 58 that isolate the interior space 54 from exterior weather conditions. This protects the utility infrastructure 56 and insulates workers W in the interior space 54 from the elements.

A walkable thoroughfare 72 is formed within the interior space 54 for allowing workers W to access the utility infrastructure 56 for inspection and maintenance. The thoroughfare 72 extends in the longitudinal direction and is laterally bounded by the interior walls 58. A flat floor 74 of the interior space 54 forms the bottom of the thoroughfare 72. The floor 74 is preferably flat to allow workers W to walk therealong without encountering any obstructions. The floor 74 also allows the workers W to travel from site to site on a small vehicle (not shown) such as a battery or gas powered cart to cover larger distances without exiting the interior space 54.

Including the thoroughfare 72 within the interior space 54 of the guideway structure 50 is advantageous for many reasons. One of the advantages is that it provides a route of transportation within the guideway structure 50, which is particularly useful when the guideway structure 50 runs through rural or isolated locations where roads are not available. Workers W can maintain and inspect the utility infrastructure 56 simply by travel along the thoroughfare 72. In the previous systems, if the utility infrastructure 56 went defective in an isolated location, the best means of transportation to the defect site was by the rail line, meaning that the rail line would likely have to be deactivated for passenger use until the defect was fixed.

Another advantage of including the thoroughfare 72 within the interior space 54 of the guideway structure 50 is that it allows the workers W to be isolated from outside weather conditions, which is useful when the guideway structure 50 extends through hot, cold, snowy, or rainy locations. The workers W are able to perform their inspections and maintenance without contending with the elements.

The guideway structure 50 may be made of any suitable structural material, including, but not limited to concrete and/or steel. Steel reinforced concrete is preferred because it allows the guideway to be fabricated in independent sections that are then joined together on site. The concrete also somewhat insulates the interior space 54 from the exterior weather and temperature.

As mentioned above, the interior space 54 of the guideway structure 50 includes utility infrastructure 56 such as power lines 102a,b, a gas or oil pipeline 96, a water pipeline 94, and communication lines 100, such as data or fiber optic lines. The guideway structure 50 provides a mechanism to link different geographic locations with utilities. Accordingly, the railway system 40 provides a means for rail transportation and a means for providing utilities.

The utility infrastructure 56 components described here are provided by way of example only. Any utility lines or pipes that are desired can be placed in the interior space for movement between different destinations.

The solar energy collector 70 is in electrical communication with the utility infrastructure 56, namely the power lines 102a,b. The solar energy collector 70 is made of conventional photovoltaic material such as, for example, photovoltaic solar cells.

In the embodiment shown, the solar energy collector 70 is positioned on top of the guideway structure 50 and extends longitudinally between the monorail tracks 62. It includes a pair of opposed longitudinally extending solar panel sections 76a,b that angle downwardly from a common apex A thereof toward the guideway structure 50. This arrangement is preferred for several reasons, which are now discussed.

By angling the panels 76a,b downwardly from a common apex A thereof, at least a portion of the solar energy collector 70 directly faces the sun as it moves across the sky when the guideway structure 50 runs north and south. For example, in the morning, the right side solar panels 76a face the sun and, in the evening, the left side solar panels 76b face the sun.

By extending the solar energy collector 70 longitudinally along the travel direction, the solar energy collector 70 has a substantial amount of photovoltaic surface area along the total length of the track 62 between different railway travel destinations. Given that the typical distance between railway travel destinations is at least on the order of several miles, over the length of the guideway structure 50, the solar energy collector 70 has an enormous surface area exposed to the sun. Accordingly, if atmospheric conditions inhibit the intensity of the solar rays incident on the solar energy collector 70 in one geographic region through which the guideway structure 50 runs, the solar energy collector 70 will continue to generate electricity because the intensity of the solar rays may not be inhibited by atmospheric conditions in another geographic region through which the guideway structure 50 also runs. In other words, if it is cloudy along one section of the railway system 40 and sunny along another section of the railway system 40, the total electricity production of the solar energy collector 70 will not be reduced as much it would be if the solar energy collector 70 was localized only to the cloudy location.

The solar energy collector 70 can be inspected and maintained by workers W who use the thoroughfare 72 by accessing a walkway 78 between the opposed solar panel sections 76a,b via a hatch 80 in a ceiling 82 of the interior space 54.

In the embodiment shown, the guideway structure 50 is upwardly supported above ground by a plurality of longitudinally spaced apart vertical beams 90 contacting the underlying terrain. As best shown in FIG. 2, the thoroughfare 72 extends all the way between the vertical beams 90.

In the embodiment shown, the interior space 54 is separated into three different levels. The thoroughfare 72 runs through the lower level 54l, water 94 and gas pipeline 96 portions of the utility infrastructure 56 run through the intermediate level 54i, and power and communications lines run through the upper level 54u. Workers W in the thoroughfare 72 may easily access each level by climbing a ladder 92.

The intermediate level 54i of the interior space 54 lies above the thoroughfare 72 and contains a longitudinally extending water pipeline 94 and a longitudinally extending gas pipeline 96. Access panels 98 may be used if desired to restrict access to the pipelines 94, 96.

The upper level 54u of the interior space 54 lies above the intermediate level 54i and contains longitudinally extending communication lines 100 and power lines 102. A ladder 92 on the upper level 54u provides worker access to the walkway 78.

Referring now to FIG. 3, electricity generated by the solar energy collector 70 is received by a DC electrical line 102a forming a portion of the power lines 102a,b. DC to AC electrical converters 104 are positioned at intermittent sections of the guideway structure 50, preferably adjacent to the vertical beams 90. The converters 104 are in electrical communication with the AC electrical line 102b for conducting AC electricity along the guideway structure 50.

A plurality of control devices 106 are positioned along the guideway structure 50 for monitoring and controlling the flow of electricity in the DC and AC electrical lines 102a,b, gas through the gas pipeline 96, water through the water pipeline 94, and data through the communications line 100.

Surplus electrical power generated by the solar energy collector 70, but not used by the railway system 40 may be fed to storage station 110, including an electrical storage device 112. Likewise, surplus water may be fed into a storage container 114 included at the storage station 110. As shown in FIG. 1, the storage station 110 is placed underground. Suitable electrical storage devices 112 include conventional batteries, capacitors, or the like. The surplus utilities are transported to the storage station 110 by passing through a conduit 116 formed through a vertical beam 90 adjacent the storage station 110.

Electrical power, gas, water, and data are distributed from the guideway structure 50 to a utility output from which they are directed to remote destinations, thereby providing utility services to destinations that might not otherwise have preexisting utility infrastructure.

A computer system 120 in data communication with the railway system 40 controls and monitors rail travel and the utility infrastructure 56. The computer system 120 communicates with a control unit 122 capable of measuring electricity in the power lines 102a,b and controlling how that power is provided to rolling stock travelling on the tracks 62. The control unit 122 is also capable of directing the flow of electricity to the electrical storage devices 112 and from the electrical storage devices back to the power lines 102a,b. The control unit 122 is further equipped to monitor, regulate, and direct the flow of the other utilities such as gas and water along the guideway structure 50 to where the utilities are needed.

The computer system 120 includes one or more processors capable of executing machine readable instructions stored on tangible machine readable memory and a display that allows an operator to visually interpret data transmitted from the control unit to the computer system. The processor executes a control unit interface, allowing the operator to input control commands that the control unit receives for manipulating the control unit's operations. The computer system 120 and control unit 122 communicate over a conventional communication network N.

The invention was described above with reference to preferred embodiments. Unless otherwise defined, all technical terms used herein are intended to have the same meaning as commonly understood in the art to which this invention pertains and at the time of its filing. Although various methods and materials similar or equivalent to those described herein can be used in the practice or testing of the present invention, suitable methods and materials are described. The skilled should understand that the methods and materials used and described are examples and may not be the only ones suitable for use in the invention.

The preferred embodiments have been described in some detail, but it will be apparent that various modifications and changes can be made within the spirit and scope of the invention as described in the foregoing specification and the appended claims.

That which is claimed is:

1. A solar railway system comprising:
   a longitudinally extending elevated monorail track member;
   a guideway structure elevating the monorail track member and having a longitudinally extending hollow body defining an interior space containing utility infrastructure;
   a thoroughfare within the interior space for allowing worker access to the utility infrastructure;
   a solar energy collector positioned on the guideway structure and in electrical communication with the utility infrastructure.

2. The solar railway system of claim 1, wherein the utility infrastructure comprises one or more of power lines, communication lines, gas lines, and water lines.

3. The solar railway system of claim 1, wherein the mono-rail track member comprises a laterally separated pair of longitudinally extending monorail tracks and the solar energy collector is positioned therebetween.

4. The solar railway system of claim 1, wherein the solar energy collector includes a pair of opposed longitudinally extending solar panel sections angling downwardly from a common apex thereof toward the guideway structure.

5. The solar railway system of claim 1, wherein the interior space is defined by longitudinally extending solid interior walls adapted to isolate the interior space from exterior weather conditions.

6. The solar railway system of claim 1, wherein:
   the guideway structure is upwardly supported by a plurality of longitudinally spaced apart vertical beams contacting underlying terrain; and
   the thoroughfare extends all the way between the vertical beams.

7. The solar railway system of claim 1, wherein the thoroughfare is defined by a floor of the interior space, the floor being elevated above ground.

8. The solar railway system of claim 1, wherein:
the utility infrastructure comprises one or more of power lines, communication lines, gas lines, and water lines;
the monorail track member comprises a laterally separated pair of longitudinally extending monorail tracks and the solar collector is positioned therebetween;
the solar energy collector includes a pair of opposed longitudinally extending solar panel sections angling downwardly from a common apex thereof toward the guideway structure;
the interior space is defined by longitudinally extending solid interior walls adapted to isolate the hollow interior from exterior weather conditions;
the guideway structure is upwardly supported by a plurality of longitudinally spaced apart vertical beams contacting underlying terrain;
the thoroughfare extends at least all the way between the vertical beams; and
the thoroughfare is defined by a floor of the interior space, the floor being elevated above ground.

9. The solar railway system of claim 1 wherein the guideway structure includes one or more interior wall members in the interior space separating the utility infrastructure from the thoroughfare.

10. A solar railway system comprising:
a monorail guideway structure elevated above ground and extending along a rail travel direction, the monorail guideway structure having a hollow body extending in the rail travel direction and containing utility infrastructure therein;
a walkable thoroughfare within the hollow body for allowing worker access to the utility infrastructure;
a solar energy collector positioned on the monorail guideway structure and in electrical communication with the utility infrastructure.

11. The solar railway system of claim 10, wherein the utility infrastructure comprises one or more of power lines, communication lines, gas lines, and water lines.

12. The solar railway system of claim 10, wherein the monorail guideway structure comprises a laterally separated pair of longitudinally extending monorail tracks and the solar energy collector is positioned therebetween.

13. The solar railway system of claim 10, wherein the solar energy collector includes a pair of opposed longitudinally extending solar panel sections angling downwardly from a common apex thereof toward the guideway structure.

14. The solar railway system of claim 10, wherein an interior space of the hollow body is defined by longitudinally extending solid interior walls adapted to isolate the interior space from exterior weather conditions.

15. The solar railway system of claim 10, wherein:
the guideway structure is upwardly supported by a plurality of longitudinally spaced apart vertical beams contacting underlying terrain; and
the walkable thoroughfare extends all the way between the vertical beams.

16. The solar railway system of claim 10, wherein the walk-able thoroughfare is defined by an interior floor of the hollow body, the floor being elevated above ground.

17. The solar railway system of claim 10, wherein:
the utility infrastructure comprises one or more of power lines, communication lines, gas lines, and water lines;
the monorail guideway structure comprises a laterally separated pair of longitudinally extending monorail tracks and the solar collector is positioned therebetween;
the solar energy collector includes a pair of opposed longitudinally extending solar panel sections angling downwardly from a common apex thereof toward the guideway structure;
an interior space of the hollow body is defined by longitudinally extending solid interior walls adapted to isolate the interior space from exterior weather conditions;
the guideway structure is upwardly supported by a plurality of longitudinally spaced apart vertical beams contacting underlying terrain;
the walkable thoroughfare extends all the way between the vertical beams; and
the walkable thoroughfare is defined by an interior floor of the hollow body.

18. The solar railway system of claim 10 wherein the guideway structure includes one or more interior wall members in the interior space separating the utility infrastructure from the thoroughfare.

19. A method of providing a solar railway system, the method comprising:
positioning a solar energy collector on a monorail guideway structure elevated above ground and extending along a rail travel direction, the monorail guideway structure having (a) a hollow body extending in the rail travel direction, (b) utility infrastructure therein, and (c) a walkable thoroughfare within the hollow body for allowing worker access to the utility infrastructure.

20. The method of claim 19, wherein the solar energy collected is positioned between a laterally separated pair of longitudinally extending monorail tracks on the guideway structure.

21. The method of claim 19, wherein the solar energy collector includes a pair of opposed longitudinally extending solar panel sections angling downwardly from a common apex thereof toward the guideway structure when positioned thereon.

22. The method of claim 19, wherein an interior space of the hollow body is defined by longitudinally extending solid interior walls adapted to isolate an interior space thereof from exterior weather conditions.

* * * * *